UNITED STATES PATENT OFFICE.

C. F. EDWARD SIMON, OF WASHINGTON TOWN, BERGEN COUNTY, N. J.

IMPROVEMENT IN RESTORING WASTE VULCANIZED RUBBER.

Specification forming part of Letters Patent No. 27,837, dated April 10, 1860.

*To all whom it may concern:*

Be it known that I, C. F. EDWARD SIMON, of Washington town, in the county of Bergen and State of New Jersey, have invented a new and Improved Mode in Restoring Waste Vulcanized Rubber, so that the same is transformed into a plastic state; and I do hereby declare that the following is a full and exact description thereof, reference being had to the accompanying exhibits.

The nature of my invention consists in mixing the waste vulcanized india-rubber, after the same is cut or torn or ground to a fine and powdered state, with chloride of lime in this proportion: To one hundred parts of waste rubber I mix two parts of chloride of lime. I then put this waste rubber, mixed with chloride of lime, into an open iron vessel or a crucible, which is previously, by the influence of a direct fire beneath and around it, brought to a high degree of heat. After the waste rubber, mixed with chloride of lime, is put into the vessel, I instantly and as fast as possible raise the heat to 1,000° to 1,100° Fahrenheit, and stir the rubber waste, during its melting and liquefying process, either with a ladle or by any other mechanical means that I may see fit to employ, till the volatilization of the sulphur is complete and the waste is transformed into a plastic state, in which it is fit to be ground, to be mixed again, and to be revulcanized.

The time necessary for my process varies between fifteen and sixty minutes; but a good result may also be obtained by exposing the waste rubber mixed with chloride of lime for a shorter time to the above-mentioned heat.

During the period of my experiments I have sometimes mixed the waste rubber with a larger proportion of chloride of lime (for the purpose of destroying entirely the bad smell emanating from the melting rubber) and exposed the same to a heat of 900° to 1,000° Fahrenheit for twelve to fifteen minutes, and the result which I obtained was also good; but in no case can the heat be lower than 900° Fahrenheit, and in no case should the waste be exposed to the heat for a longer time than two hours.

After having described the nature of my invention and fully stated the manner in which others skilled in the art can make and use my invention, I distinctly disclaim the use of the process patented to Hiram L. Hall, November 30, 1858, and of the process patented to Francis Bashnagel, June 22, 1858, as their mode and method form no part of my invention.

What I claim as my invention, and desire to secure by Letters Patent of the United States, is—

The mixing of the ground or cut or torn waste of vulcanized india-rubber with chloride of lime, in the manner described, and the exposing of the same to a heat of 900° to 1,200° Fahrenheit, for the time and in the manner substantially pointed out.

C. F. ED. SIMON.

Witnesses:
T. ELLESER,
W. SAVAGE.